W. J. WILCOX.
Lard Cooler.

No. 57,805.　　　　　　　　　　　　　Patented Sept. 4, 1866.

Witnesses:　　　　　　　　　　　　　Inventor:

UNITED STATES PATENT OFFICE.

WILLIAM J. WILCOX, OF NEW YORK, N. Y.

IMPROVEMENT IN COOLING LARD.

Specification forming part of Letters Patent No. 57,805, dated September 4, 1866.

*To all whom it may concern:*

Be it known that I, WILLIAM J. WILCOX, of the city, county, and State of New York, have invented a new and useful Improvement in Cooling Lard; and I do hereby declare that the following is a full, clear, and exact description thereof, which will enable others skilled in the art to make and use the same, reference being had to the accompanying drawings, forming part of this specification, in which—

Figure 1:
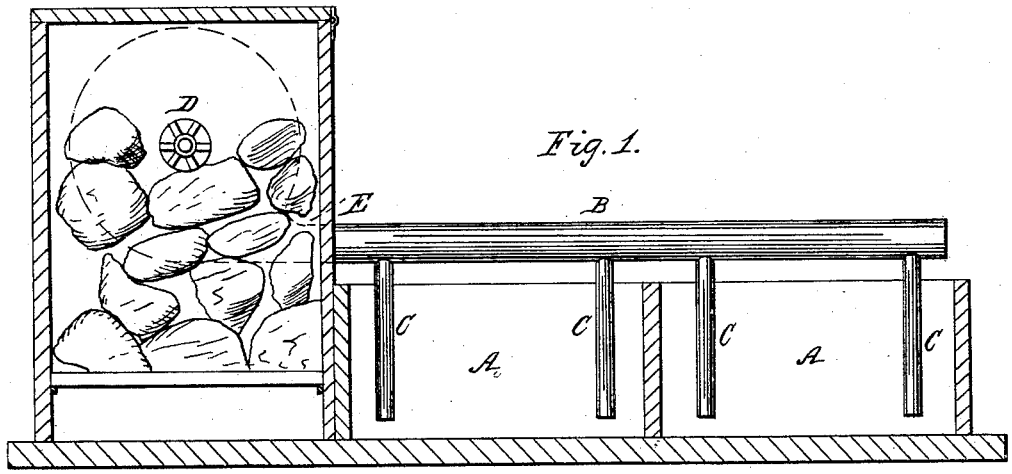
Figure 2:
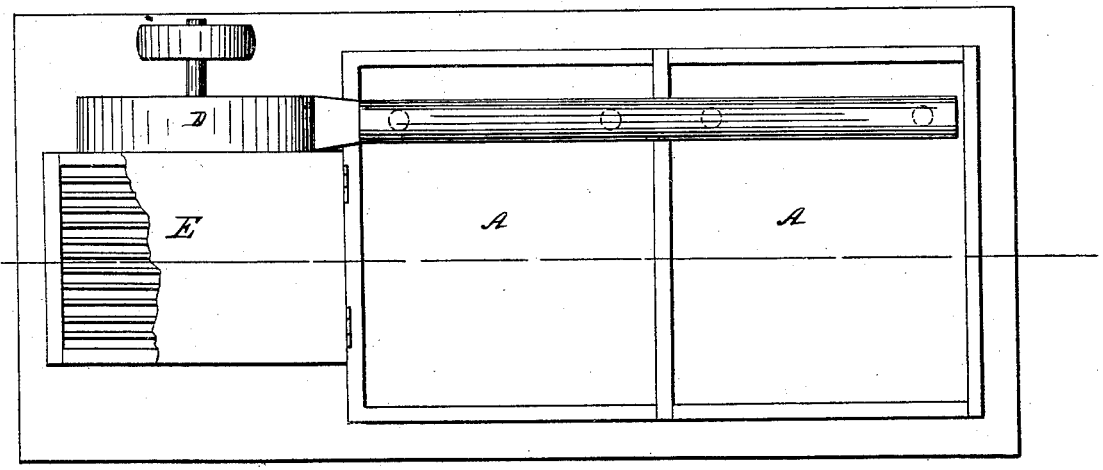

Figure 1 represents a longitudinal vertical section of this invention. Fig. 2 is a plan or top view of the same.

Similar letters of reference indicate like parts.

This invention consists in passing into or through the lard when the same is to be cooled one or more impelled currents of cold air in such a manner that said air is compelled to pass through the liquid mass, and that by its action the lard is rapidly and effectually cooled without requiring any hand-labor.

A A represent the tanks which contain the liquid lard.

The usual method of cooling the lard is to stir the same with wooden crutches by hand or machinery; and the object of the stirring operation is twofold: first, to cool the lard; and, second, to bring the same in contact with continually-changing air, whereby the article is rendered smooth and brought in the proper state for the market.

In addition to stirring the lard with crutches, I cool the same by injecting into the pans currents of cold air, and for this purpose I arrange over on the sides of the pans a pipe, B, from which extend branch pipes C down near to the bottoms of the several pans, as shown in Fig. 1. A fan-blower, D, or any other suitable mechanism, serves to drive the air through the pipes B C into the pans; and in the hot season, when the air is not cold enough to produce the desired effect, I pass the same through an ice-box, E, so that it is cooled down before it is poured into the pans. The ice-box may be situated close to the pans, or in any convenient spot in the building, and it may be made simply of wood, with a perforated or slotted bottom, through which the external air finds access; or the sides and tops of the box may be perforated, so as to admit the largest possible quantity of air to the ice in said box. By the impelled currents of cold air which are thus injected into the liquid lard said lard is rapidly cooled, and at the same time it is continually brought in contact with fresh air, and a superior article is obtained.

A cooling effect would also be produced by blowing air on the top of the lard instead of down into it, and I reserve the right to change my apparatus in this respect if I hall see fit to do so.

What I claim as new, and desire to secure by Letters Patent, is—

The within-described method of cooling lard by passing over or through the same one or more impelled currents of cold air, substantially as and for the purpose described.

WILLIAM J. WILCOX.

Witnesses:
WM. F. MCNAMARA,
ALEX. F. ROBERTS.